US00RE50577E

(19) United States
(12) Reissued Patent
Petrovic et al.

(10) Patent Number: US RE50,577 E
(45) Date of Reissued Patent: Sep. 2, 2025

(54) WATERMARK BASED CONTENT RECOGNITION IMPROVEMENTS

(71) Applicant: Verance Corporation, San Diego, CA (US)

(72) Inventors: Rade Petrovic, San Diego, CA (US); Joseph M. Winograd, San Diego, CA (US)

(21) Appl. No.: 17/992,934

(22) Filed: Nov. 23, 2022

Related U.S. Patent Documents

Reissue of:
(64) Patent No.: 10,848,821
Issued: Nov. 24, 2020
Appl. No.: 16/378,378
Filed: Apr. 8, 2019

(51) Int. Cl.
*H04N 21/44* (2011.01)
*G06F 21/16* (2013.01)
(Continued)

(52) U.S. Cl.
CPC ..... *H04N 21/44008* (2013.01); *G06F 21/16* (2013.01); *G06T 1/005* (2013.01); *H04N 21/8352* (2013.01); *H04N 21/8358* (2013.01); *H04N 21/8456* (2013.01); *G06T 2201/0065* (2013.01)

(58) Field of Classification Search
CPC ..... H04N 21/8352; H04N 21/8456; H04N 21/44008; H04N 21/8348; G06F 21/16; G06T 1/005; G06T 1/0085; G06T 2201/0065; G06T 2201/0601
See application file for complete search history.

(56) References Cited

U.S. PATENT DOCUMENTS 6,122,610 A 9/2000 Isabelle
6,145,081 A 11/2000 Winograd et al.
(Continued)

FOREIGN PATENT DOCUMENTS

JP 2004163855 6/2004
JP 2004173237 6/2004
(Continued)

OTHER PUBLICATIONS

Aris Technologies, Inc. "Audio Watermarking System to Screen Digital Audio Content for LCM Acceptance," May 1999 (17 pages).
(Continued)

*Primary Examiner* — Jalatee Worjloh
(74) *Attorney, Agent, or Firm* — Donald L. Wenskay

(57) ABSTRACT

Method, devices, systems and computer program products are described that improve speed and accuracy of watermark detection from multimedia content, and allow faster and better content recognition. One technique for improving detection of boundaries of an embedded multimedia content segment includes detecting a synchronization header and a full watermark from the multimedia content, constructing a predicted watermark segment that is positioned at a predicted distance from the synchronization header, and comparing the group of candidate watermark symbols obtained from the multimedia content to the first predicted watermark segment to obtain a match. The disclosed techniques enable extraction of watermarks from short content segments, and can utilize a shortened payload design to establish media time during content usage.

23 Claims, 6 Drawing Sheets

(51) Int. Cl.

| | |
|---|---|
| ***G06T 1/00*** | (2006.01) |
| ***H04N 21/8352*** | (2011.01) |
| ***H04N 21/8358*** | (2011.01) |
| ***H04N 21/845*** | (2011.01) |

(56) References Cited

U.S. PATENT DOCUMENTS

| | | | | |
|---|---|---|---|---|
| 6,175,627 | B1 | 1/2001 | Petrovic et al. | |
| 6,427,012 | B1 | 7/2002 | Petrovic | |
| 6,430,301 | B1 | 8/2002 | Petrovic | |
| 6,683,958 | B2 | 1/2004 | Petrovic | |
| 6,792,542 | B1 | 9/2004 | Lee et al. | |
| 6,888,943 | B1 | 5/2005 | Lam et al. | |
| 6,931,536 | B2 | 8/2005 | Hollar | |
| 7,024,018 | B2 | 4/2006 | Petrovic | |
| 7,159,118 | B2 | 1/2007 | Petrovic | |
| 7,224,819 | B2 | 5/2007 | Levy et al. | |
| 7,460,667 | B2 | 12/2008 | Lee et al. | |
| 7,983,922 | B2 | 7/2011 | Neusinger et al. | |
| 7,986,806 | B2 | 7/2011 | Rhoads | |
| 7,991,995 | B2 | 8/2011 | Rabin et al. | |
| 8,015,410 | B2 | 9/2011 | Pelly et al. | |
| 8,055,013 | B2 | 11/2011 | Levy et al. | |
| 8,059,815 | B2 | 11/2011 | Lofgren et al. | |
| 8,059,858 | B2 | 11/2011 | Brundage et al. | |
| 8,085,935 | B2 | 12/2011 | Petrovic | |
| 8,138,930 | B1 | 3/2012 | Heath | |
| 8,151,113 | B2 | 4/2012 | Rhoads | |
| 8,181,262 | B2 | 5/2012 | Cooper et al. | |
| 8,189,861 | B1 | 5/2012 | Rucklidge | |
| 8,194,803 | B2 | 6/2012 | Baum et al. | |
| 8,249,992 | B2 | 8/2012 | Harkness et al. | |
| 8,280,103 | B2 | 10/2012 | Petrovic et al. | |
| 8,301,893 | B2 | 10/2012 | Brundage | |
| 8,315,835 | B2 | 11/2012 | Tian et al. | |
| 8,321,679 | B2 | 11/2012 | Petrovic et al. | |
| 8,340,348 | B2 | 12/2012 | Petrovic et al. | |
| 8,346,532 | B2 | 1/2013 | Chakra et al. | |
| 8,346,567 | B2 | 1/2013 | Petrovic et al. | |
| 8,467,717 | B2 | 6/2013 | Croy et al. | |
| 8,479,225 | B2 | 7/2013 | Covell et al. | |
| 8,533,481 | B2 | 9/2013 | Petrovic et al. | |
| 8,538,066 | B2 | 9/2013 | Petrovic et al. | |
| 8,588,459 | B2 | 11/2013 | Bloom et al. | |
| 8,589,969 | B2 | 11/2013 | Falcon | |
| 8,601,504 | B2 | 12/2013 | Stone et al. | |
| 8,615,104 | B2 | 12/2013 | Petrovic et al. | |
| 8,682,026 | B2 | 3/2014 | Petrovic et al. | |
| 8,726,304 | B2 | 5/2014 | Petrovic et al. | |
| 8,745,403 | B2 | 6/2014 | Petrovic | |
| 8,781,967 | B2 | 7/2014 | Tehranchi et al. | |
| 8,791,789 | B2 | 7/2014 | Petrovic et al. | |
| 8,806,517 | B2 | 8/2014 | Petrovic et al. | |
| 8,811,655 | B2 | 8/2014 | Petrovic et al. | |
| 8,838,977 | B2 | 9/2014 | Winograd et al. | |
| 8,838,978 | B2 | 9/2014 | Winograd et al. | |
| 8,869,222 | B2 | 10/2014 | Winograd et al. | |
| 8,923,548 | B2 | 12/2014 | Petrovic et al. | |
| 9,009,482 | B2 | 4/2015 | Winograd | |
| 9,055,239 | B2 | 6/2015 | Tehranchi et al. | |
| 9,106,964 | B2 | 8/2015 | Zhao | |
| 9,117,270 | B2 | 8/2015 | Wong et al. | |
| 9,485,089 | B2 * | 11/2016 | Petrovic | G09C 5/00 |
| 2001/0029580 | A1 * | 10/2001 | Moskowitz | G06F 21/10 713/176 |
| 2005/0271246 | A1 * | 12/2005 | Sharma | G06Q 20/3823 382/100 |
| 2007/0039018 | A1 | 2/2007 | Saslow et al. | |
| 2007/0061580 | A1 * | 3/2007 | Venkatesan | G06F 21/10 713/176 |
| 2011/0261667 | A1 | 10/2011 | Ren et al. | |
| 2011/0286625 | A1 * | 11/2011 | Petrovic | H04L 9/002 382/100 |
| 2011/0293090 | A1 | 12/2011 | Ayaki et al. | |
| 2011/0320627 | A1 | 12/2011 | Landow et al. | |
| 2012/0023595 | A1 | 1/2012 | Speare et al. | |
| 2012/0072731 | A1 | 3/2012 | Winograd et al. | |
| 2012/0102304 | A1 | 4/2012 | Brave | |
| 2012/0122429 | A1 | 5/2012 | Wood et al. | |
| 2012/0129547 | A1 | 5/2012 | Andrews, III et al. | |
| 2012/0203556 | A1 | 8/2012 | Villette et al. | |
| 2012/0203734 | A1 | 8/2012 | Spivack et al. | |
| 2012/0216236 | A1 | 8/2012 | Robinson et al. | |
| 2012/0265735 | A1 | 10/2012 | McMillan et al. | |
| 2012/0272012 | A1 | 10/2012 | Aronovich et al. | |
| 2012/0272327 | A1 | 10/2012 | Shin et al. | |
| 2012/0300975 | A1 | 11/2012 | Chalamala et al. | |
| 2012/0304206 | A1 | 11/2012 | Roberts et al. | |
| 2012/0308071 | A1 | 12/2012 | Ramsdell et al. | |
| 2013/0031579 | A1 | 1/2013 | Klappert | |
| 2013/0060837 | A1 | 3/2013 | Chakraborty et al. | |
| 2013/0073065 | A1 | 3/2013 | Chen et al. | |
| 2013/0114847 | A1 | 5/2013 | Petrovic et al. | |
| 2013/0129303 | A1 | 5/2013 | Lee et al. | |
| 2013/0151855 | A1 | 6/2013 | Petrovic et al. | H04N 21/4627 713/176 |
| 2013/0151856 | A1 | 6/2013 | Petrovic et al. | |
| 2013/0152210 | A1 * | 6/2013 | Petrovic | G06F 21/10 726/26 |
| 2014/0067950 | A1 | 3/2014 | Winograd | |
| 2014/0074855 | A1 | 3/2014 | Zhao et al. | |
| 2014/0075465 | A1 | 3/2014 | Petrovic et al. | |
| 2014/0075469 | A1 | 3/2014 | Zhao | |
| 2014/0267907 | A1 | 9/2014 | Downes et al. | |
| 2014/0270337 | A1 | 9/2014 | Zhao et al. | |
| 2014/0270338 | A1 | 9/2014 | Zhao et al. | |
| 2014/0279549 | A1 | 9/2014 | Petrovic et al. | |
| 2014/0325550 | A1 | 10/2014 | Winograd et al. | |
| 2014/0325673 | A1 | 10/2014 | Petrovic | |
| 2015/0030200 | A1 | 1/2015 | Petrovic et al. | |
| 2015/0036873 | A1 | 2/2015 | Petrovic et al. | |
| 2015/0121534 | A1 | 4/2015 | Zhao et al. | |

FOREIGN PATENT DOCUMENTS

| | | |
|---|---|---|
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 1020120128149 | 11/2012 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011116309 | 9/2011 |
| WO | 2013163921 | 11/2013 |

OTHER PUBLICATIONS

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual

(56) References Cited

OTHER PUBLICATIONS watermarking and fingerprinting system," Multimedia '02 Proceedings of the tenth ACM international conference on Multimedia, 2002 (11 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce,"Proc. Int. Conf. on Imaging Science, Systems and Applications (CISSA'97), Jun./Jul. 1997 (7 pages).
International Search Report and Written Opinion for International Patent Application No. PCT/US2016/027614, dated Jul. 26, 2016 (8 pages).

* cited by examiner

Table 1 – Flexible Watermark Payload Format

| *Payload Type* | *Encoding Type Field Size [bits]* | *Identifier Field Size [bits]* | *Encoding Type Field Values* | *Identifier Encodings* | *Retrievability* |
|---|---|---|---|---|---|
| Short | 4 | 39 | 0<br>1<br>2<br>3-15 | Ad-ID (Compact)<br>EIDR (Party ID)<br>EIDR (Service ID)<br>reserved | < 3 seconds |
| Medium | 4 | 60 | 0<br>1<br>2<br>3-15 | Ad-ID (Full)<br>EIDR (Short DOI)<br>SCIC<br>reserved | < 3 seconds |
| Long | 4 | 80 | 0<br>1-15 | EIDR (Content ID)<br>reserved | < 5 seconds |
| Extra Long | 8 | 96 | 0<br>1-255 | EIDR (Compact Binary)<br>reserved | < 5 seconds |

FIG. 3

WATERMARK BASED CONTENT RECOGNITION IMPROVEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation of U.S. patent application Ser. No. 15/570,238, filed Oct. 27, 2017, now issued as U.S. Pat. No. 10,257,567, which is a national phase application of PCT/US2016/027614, filed Apr. 14, 2016, which claims the benefit of priority of U.S. Provisional Patent Application No. 62/155,398, filed Apr. 30, 2015, U.S. Provisional Patent Application No. 62/156,586, filed May 4, 2015, and U.S. Provisional Patent Application No. 62/163,289, filed May 18, 2015. The entire contents of the above applications are incorporated by reference as part of the disclosure of this document.

TECHNICAL FIELD

The subject matter of this patent document generally relates to the field of content management. More particularly, the disclosed embodiments relate to improvements in watermark based content recognition.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, and other sources.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. One technique for identifying a content uses watermarks that are embedded into a multimedia content (e.g., in the audio or video portions). The watermarks carry information that can be used for automatic content recognition (ACR).

SUMMARY OF THE INVENTION

The disclosed embodiments relate to techniques for improving watermark based content recognition. Embodiments include improvements to enable extraction from short segments by using shortened payload design and to establish media time during content usage. Embodiments also include improvements to detector design to increase the speed of content recognition and provide more accurate watermarked segment boundary determinations. Further embodiments minimize the number of data exchanges between a watermark detector and a database.

One aspect of the disclosed embodiments relates to a method for detecting one or more boundaries of a watermarked segment in a multimedia content that includes receiving the multimedia content at a watermark extractor that is implemented at least partly in electronic circuitry; at the watermark extractor, extracting a plurality of candidate watermark symbols from the multimedia content that correspond to one or more embedded watermarks in the multimedia content and storing the extracted candidate watermark symbols in a non-transitory computer readable medium. The method further includes processing the extracted candidate watermark symbols to detect a synchronization header and to detect remaining symbols of a full watermark using the synchronization header. In addition, based on the detected full watermark, constructing a first predicted watermark segment that includes a specific number of symbols and positioned at a first predicted distance from the synchronization header, where the specific number is smaller than the number of symbols in the detected full watermark. The above noted method also includes retrieving, from the non-transitory computer readable medium, a group of candidate watermark symbols having the same number of symbols as the first predicted watermark segment and positioned at the same distance from the synchronization header as the first predicted distance, and comparing the group of candidate watermark symbols to the first predicted watermark segment. In the above described method, upon a determination that a number of mismatched symbols between the group of candidate watermark symbols and the first predicted watermark segment is less than a first threshold value, starting point of the group of candidate watermark symbols is designated as a starting section of the watermarked segment within the multimedia content.

Another aspect of the disclosed embodiments relates to a method for facilitating detection of a watermark from a segment of multimedia content that includes the following operations: (a) receiving the multimedia content at a watermark extractor that is implemented at least partly in electronic circuitry; (b) at the watermark extractor, extracting a plurality of candidate watermark symbols from the multimedia content that correspond to at least a portion of one or more embedded watermarks in the multimedia content and storing the extracted candidate watermark symbols in a non-transitory computer readable medium, wherein each of the one or more embedded watermarks has W symbols; (c) detecting a watermark synchronization pattern from the multimedia content, wherein the watermark synchronization pattern has H symbols and identifies start of a corresponding embedded watermark; (d) extracting k candidate watermark symbols from multimedia content subsequent to the detection of the watermark synchronization pattern, wherein k is selected to be a number this greater than or equal to 2 and less than W symbols; (e) retrieving W-H-k of the candidate watermark symbols from the non-transitory computer readable medium; (f) forming a candidate watermark by appending the retrieved W-H-k candidate watermark symbols to the H symbols of the watermark synchronization pattern and to the k candidate watermark symbols; (g) determining whether or not the candidate watermark forms a valid watermark; and (h) upon a determination that the candidate watermark forms a valid watermark, generation a signal that is indicative of a successful watermark detection.

Another aspect of the disclosed embodiments relates to a device that includes a processor and a memory that includes processor executable code. The processor executable code, when executed by the processor, causes the device to receive the multimedia content, extract a plurality of candidate watermark symbols from the multimedia content that correspond to one or more embedded watermarks in the multimedia content and store the extracted candidate watermark symbols in a non-transitory computer readable medium. The processor executable code, when executed by the processor, also causes the device to process the extracted candidate watermark symbols to detect a synchronization header and to detect remaining symbols of a full watermark using the synchronization header, and based on the detected full watermark, construct a first predicted watermark segment that includes a specific number of symbols and positioned at a first predicted distance from the synchronization header, where the specific number is smaller than the number of symbols in the detected full watermark. The processor executable code, when executed by the processor, further causes the device to retrieve, from the non-transitory computer readable medium, a group of candidate watermark symbols having the same number of symbols as the first predicted watermark segment and positioned at the same distance from the synchronization header as the first predicted distance, compare the group of candidate watermark symbols to the first predicted watermark segment, and upon a determination that a number of mismatched symbols between the group of candidate watermark symbols and the first predicted watermark segment is less than a first threshold value, designate starting point of the group of candidate watermark symbols as a starting section of the watermarked segment within the multimedia content.

Another aspect of the disclosed technology relates to a device that includes a processor, and a memory including processor executable code. The processor executable code upon execution by the processor, causes the device to: (a) receive the multimedia content; (b) extract a plurality of candidate watermark symbols from the multimedia content that correspond to at least a portion of one or more embedded watermarks in the multimedia content and store the extracted candidate watermark symbols in a non-transitory computer readable medium, wherein each of the one or more embedded watermarks has W symbols; (c) detect a watermark synchronization pattern from the multimedia content, wherein the watermark synchronization pattern has H symbols and identifies start of a corresponding embedded watermark; (d) extract k candidate watermark symbols from multimedia content subsequent to the detection of the watermark synchronization pattern, wherein k is selected to be a number this greater than or equal to 2 and less than W symbols; (e) retrieve W-H-k of the candidate watermark symbols from the non-transitory computer readable medium; (f) form a candidate watermark by appending the retrieved W-H-k candidate watermark symbols to the H symbols of the watermark synchronization pattern and to the k candidate watermark symbols; (g) determine whether or not the candidate watermark forms a valid watermark; and (h) upon a determination that the candidate watermark forms a valid watermark, generate a signal that is indicative of a successful watermark detection.

BRIEF DESCRIPTION OF THE DRAWINGS

FIG. 3 illustrates a listing of watermark payload structures for embedding of watermarks using multiple payload formats in accordance with an exemplary embodiment.

DETAILED DESCRIPTION OF CERTAIN EMBODIMENTS

Figure 1:
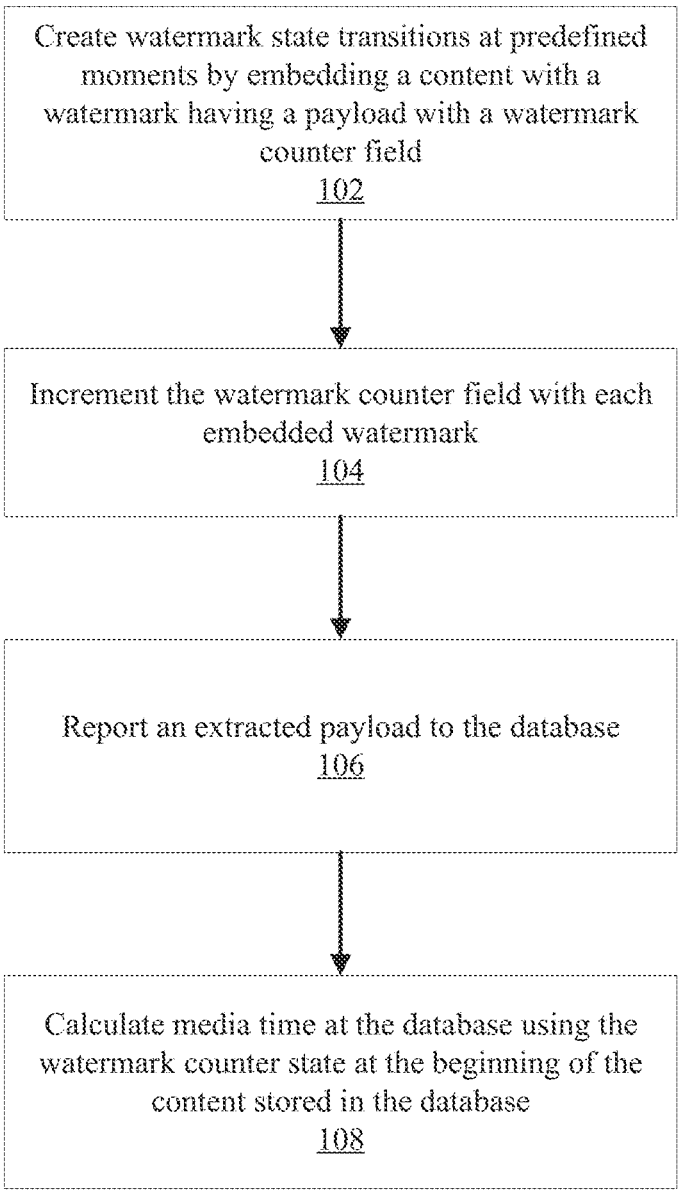
FIG. 1 illustrates a set of exemplary operations that can be carried out for establishing media time during content usage in accordance with an exemplary embodiment.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, watermarks can be used for Automatic Content Recognition (ACR) of audio, images, video or other types of content. In remaining sections of this document, examples are provided that focus on ACR of an audiovisual content, although similar concepts can be applied to other types of content. To identify a content using ACR watermarks, the payloads of the detected watermarks can, for example, include a unique identification value as part of the watermark payload, or can include a pointer that links distinct watermark payloads to a content metadata using a database. The watermark payloads can be self-assigned and include, for example, an embedder ID and a serial number, which can uniquely identify each piece of content that is marked in a separate embedding run. Alternatively, or additionally, the watermark can include existing Digital Object Identifiers (DOI) such as Entertainment Identification Registry (EIDR) codes, Advertisement Identification (AdID) codes, or other standardized identification codes.

Besides identifying the content itself, watermarks can be used also to identify a content distribution channel, e.g. to discriminate between distribution using printed disks, electronic sell through, streaming services, broadcast channels, etc. Further, watermarks can be used to discriminate different versions of the content, for example, different content editing versions, versions that include dubbing in a foreign language, versions with differing video resolutions, etc.

In ACR applications, watermarks are often designed with a set of requirements that differ from requirements that are imposed on other types of watermarks, such as copy control watermarks. Similarly, the detection of ACR watermarks imposes different types of requirements on ACR watermark detectors. For example, in some ACR applications, it is critical to be able to recognize a content very quickly so as to allow the associated content (e.g., a secondary content), metadata or interactive services to be readily accessed and provided to the users (who often have a short attention span).

In some ACR applications, also desirable to identify the media time, i.e., to identify which part of the content has been used. This includes accurately identifying the locations within host content that contain the embedded watermarks, and/or the boundary locations of the embedded watermarks within the host content. In particular, it is important to determine the start and end locations of a watermarked particular clip (e.g., a particular advertisement, or a particular content segment). For example, in the SMPTE Request for Proposals—Open Binding of IDs To Media (issued December 2014) ("SMPTE RFP"), a transition to or from a uniquely identified or unidentified piece of content needs to be detected with a granularity of 1 second of the transition. The SMPTE RFP is incorporated by references in this patent document and also forms part of the U.S. provisional applications that are listed above under related applications to this patent document. Furthermore, establishing media time during broadcasts or streaming of live events can be used to measure latencies in different distribution channels. In some cases the latency measurement can lead to latency equalization, i.e. the content distribution on a short-latency channel could be delayed in order to match the latency of a long-latency channel.

Detection of ACR watermark locations within a content can also be beneficial to content usage monitoring applications, where a watermark detector module that is configured to monitor content distribution or content rendering would pick up the embedded codes and report them to a database. The detection of watermarks in this setting can also be used for proof of performance, e.g. to ensure that certain advertisements are delivered according to the contractual arrangement. Furthermore, ACR can be used to modify the content that includes, for example, inserting ads that are tailored to the content recipient, based on the recipient's location, recipient's preferences, or the features of the rendering device.

To achieve the stated benefits and features, it is important to enable watermark payload extraction from short content segments, e.g., as short as three seconds of audiovisual content. It is also desirable to establish duration of the linear content usage. The linear content usage can be defined as duration of an uninterrupted playback of a content (e.g., an audiovisual content). In the presence of content interruptions, such as skip back/forward or pause/resume playback or other interruptions, separate marked content segments can be reported for each stretch of uninterrupted playback.

Considerations for Payload Design

In order to achieve payload extraction from short content segments, it is desirable to use short payloads. However, short payloads may not able to carry preexisting (e.g., standardized) identification payloads that use preexisting databases. Having a watermark payload that includes carries already-established DOIs would in turn increase the payload size, as most of such preexisting DOI's are not designed to minimize the payload size. In particular, one such preexisting DOI, namely, EIDR, has a compact binary representation that is 96 bits long, which provides $2^{96}=7.9\times10^{28}$ distinct codes, far more than the number of anticipated distinct entertainment digital objects.

In order to establish media time during content usage, watermark state transitions (i.e., change of all or sections of a watermark from one value or state to another value or state) can be created at predefined moments. For example watermark payload can have a field such as a watermark counter, which is incremented with each embedded watermark. The watermark counter state (e.g., counter value) at the beginning of the content can be stored in a database. The media time associated with each subsequent watermark state transition can also be stored at the database, or simply computed using the known watermark duration. It is then easy to calculate media time for any detected watermark using the information at the database when the extracted payload from the content is obtained by a device in the field. It should be noted that incrementing the watermark counter with each embedded watermark may unnecessarily burden the watermark payload, and hurt the ability to detect watermarks from short content segments. Further, constant changing of watermark payloads can impede that ability to combine portions of adjacent detected watermark packets to attempt payload extraction, as described below. Therefore, it may be desirable to increment the watermark counter after every N watermarks, instead of each watermark. In one example, N is 256. This way, the watermark counter field that is included in the watermark payload is 8 bits shorter compared the scenario in which the watermark counter is incremented for each watermark.

It should be noted that every watermark state transition can establish media time for an entire continuously consumed content segment. For example, when a segment of the content is being viewed, the detected watermarks are extracted and stored (or transmitted to a database). At this point, while the detection of watermarks indicates that a marked segment is being viewed, the detector has no knowledge of media time since it cannot yet identify which segment of the host content is being viewed. When a transition in the watermark state is detected, however, the detected transition is reported to the database and the corresponding media time is obtained based on the information that is stored at the database. Once the media time at the transition point is identified, the media times corresponding to previously detected watermarks (and intervening non-watermark events) can be computed.

In the examples scenarios that involve detecting actions that do not have their own marks, such as banner ads, click tags, pop-ups etc., a transition that comes after the those actions can be used to identify a state transition if the database includes information regarding the timing of those actions (e.g., with respect to the media time). In this case, the database is informed when the first watermark is detected in the content, and when the watermark state transition occurs. The watermark state transition establishes the media time, and the separation in time of the first detected watermark and the watermark transition event corresponding to the unmarked content provides the information on when (with respect to the media timeline) the content usage for the unmarked action has started. If the unmarked action is scheduled anywhere during the content usage interval, it should be counted.

Watermark state transition doesn't have to be based on watermark payload change. In some embodiments, periodic transitions in watermark stego key can also enable establishment of the media timeline, when, for example, those transitions are linked to media timeline in the database. Watermark stego key identifies potential locations in which watermarks can be embedded in a content, and include a plurality of components that each identify a particular aspect or characteristic of the watermarks or the watermarking system. For example, the plurality of stego key components can identify a pseudorandom sequence used for embedding or detection of watermarks, a replica signal, an autocorrelation value, a frequency shift, a frequency band, a watermark bit rate, a time segment within the content that includes the embedded watermarks, or even a watermark extraction algorithm used for detection of watermarks. A more detailed account of watermark stego keys is described in the commonly owned U.S. Pat. No. 7,616,776. Using watermark stego key transitions instead of the payload would further reduce payload and watermark duration, and help detection in a short content segments.

Preexisting databases, such EIDR or AdID, are not designed to keep information about watermark state transitions and media timeline. Thus, in ACR implementations that rely on such preexisting DOIs, another watermark registry database is needed to establish the media timeline. In some embodiments, such an additional watermark registry database can serve for a translation of compact watermark codes to DOIs. It should be noted that the watermark registry database can be populated with content metadata linked directly to the watermark codes even prior to the content registration with DOI database. The link between watermark codes and DOIs can be established after the watermark registry is populated with the link between watermark codes and the content metadata.

Due to various tradeoff between the use of preexisting databases (and skipping the watermark registry) and having more compact codes with the media time detection ability, the disclosed watermark based ACR systems can include multiple payload options with minimum cost, which allows for future selection of an appropriate technique.

In some embodiments, in order to enable a low cost watermarking system with multiple payload options, all payload options are configured to use the same stego key or the same set of stego keys (if stego key transition is used for media time detection). This way the detector processing load is reduced, as compared to detecting the different payloads based on searches that require distinct stego keys for each payload. The use of the same stego key (or set of stego keys) also allows a watermark with one payload to be overwritten with another watermark with a different payload. In this scenario, prior to the overwriting process, the watermark embedder can check the existence of upstream marks (i.e., existing watermarks that are embedded in other locations in the content), and save a record of those watermarks into the database for further use.

Furthermore, having the same stego key allows the same synchronization method to be used for all payload options. Synchronization schemes often include embedding of a special synchronization (sometimes called header) patterns that signals the beginning, or sometimes the end, location of an embedded watermark. Using the same synchronization method is advantageous, especially when synch acquisition in the watermark decoder takes significant processing power, as, for example, in spread spectrum watermarking technologies.

FIG. 1 shows a set of exemplary operations that can be carried out for establishing media time during content usage in accordance with an exemplary embodiment. At 102, watermark state transitions are created at specified moments by embedding a content with a watermark having a payload that includes a watermark counter field. At 104, the watermark counter field is incremented for each embedded watermark. At 106, upon extraction of a watermark from the content, an extracted payload is reported to a database. At 108, media time is calculated at the database using watermark counter state at the beginning of the content stored at the database. As noted earlier, given that the watermark durations are known, watermark state transition at any given point in the content allows the determination of duration of a continuously consumed content with respect to the beginning of the content.

Detector Design Adjustments

In the remaining sections of this documents, it is assumed that the embedded watermarks are represented by a string of bits embedded into the content without substantially impacting the content quality. Typically, the bit string consists of a header, followed by payload, and followed by an error correction and/or error detection field. It is noted, however, that other arrangement of the bit string and fields of bit strings can be implemented within the scope of the disclosed embodiments.

As described earlier, in ACR applications, it is desired to recognize a content quickly, as soon as its usage begins. For example, such a quick content recognition is particularly useful when a user switches TV channels and starts viewing a new content. In this case, the detector must first detect the boundaries of the embedded watermarks in order to identify the proper order of the bits in the watermark. Typically, this is achieved by detecting a header bit-string that identifies the start of the watermark, followed by assembly of subsequent watermark bits. The time it takes to detect an initial watermark in a content segment (i.e., time to first watermark payload extraction) depends on how the arrangement of the watermark bit-string with respect to the media content. For example, if the marked content segment starts immediately after the watermark header pattern, the watermark detector must wait to detect a second header pattern in order to establish a watermark boundary, and start assembling bits. In this example, it is assumed that each watermark starts with a header pattern, and several watermarks are embedded in within the content. This means that to detect a watermark, at a minimum, a segment of the host content equal to the duration of one watermark (e.g., the header, the payload bit-sting and the error correction field) plus one header pattern of the next watermark must be examined.

In some implementations, when the watermark bit-string is the same in two or more adjacent watermarks, time to first watermark payload extraction can be improved as compared to the procedure described above. To do this, it is necessary for the detector to be able to go back in time, i.e., to establish whether or not a watermark bit-string prior to the detected header pattern exits, and use that information to improve the time to first watermark extraction. This can be achieved by reexamining the content that has passed through detector already. In one implementation, rather than reexamining the content itself, detected watermark bits from prior content segments can be stored in a bit buffer, and once a header is detected, the bit buffer can be analyzed and processed to assemble the watermark payload that precedes the header hit. This way, it is not necessary to wait until the next header detection to establish watermark boundaries, but rather the watermark payload that precedes the header detection can be extracted immediately after the first header detection.

In the above scenario, it is assumed that the bit-buffer contains the bits for an entire watermark that precedes the detected header. This may be the case in many instances where the bit buffer contains many bits that would allow construction of a few watermarks. However, in some scenarios, such as when the user decides to view another program on a different channel, the bit buffer may not contain enough bits that are extracted from the newly-switched program. Thus, when a header is detected, the bit-string that is retrieved from the bit buffer and assembled to form a candidate watermark may not form a proper watermark that precedes the header location. Whether or not a proper watermark is detected is usually established using error correction and/or error detection fields. According to some embodiments, when a correct watermark is not detected in the above scenario, the detector keeps detecting a group of watermark bits subsequent to the header pattern, and combines the group of bits with bits corresponding to the preceding watermark. The detector then tries again to extract the payload. In particular, if the bit-string for each watermark is W bits long, and the header consists of H bits, then the detector can take k bits ($2 \leq k \leq W$) from the watermark subsequent to the header pattern, and append to it the (W-H-k) bits taken from the bit buffer that correspond to the watermark that precedes the header to create a new candidate watermark string. The candidate watermark string can then checked using error correction/detection fields to determine if a valid watermark can be detected. This procedure can be done for many different values of k.

Figure 2:
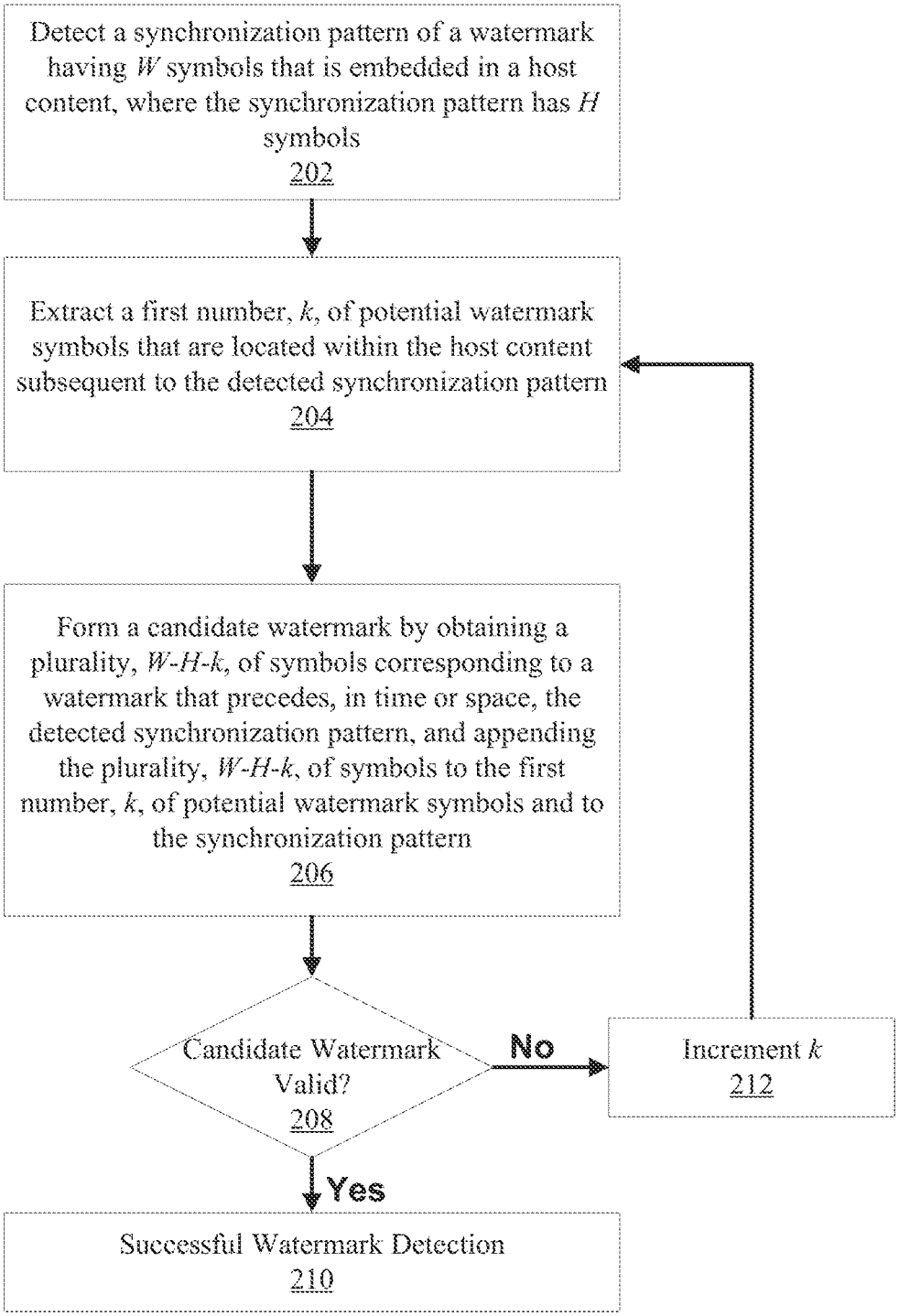
FIG. 2 illustrates a set of exemplary operations that can be carried out to improve time to first watermark extraction using portions of two adjacent watermarks in accordance with an exemplary embodiment.

FIG. 2 illustrates a set of exemplary operations that can be carried out to improve time to first watermark extraction using portions of two adjacent watermarks in accordance with an exemplary embodiment. Prior to the operations at 202, the multimedia content that includes one or more embedded watermarks is received at a watermark extractor and a plurality of candidate watermark symbols are extracted from the multimedia content that correspond to at least a portion of one or more embedded watermarks. Those extracted candidate watermark symbols are stored in a memory device. At 202, a synchronization pattern of a watermark having W symbols that is embedded in a host content is extracted, where the synchronization pattern has H symbols. At 204, a first number, k, of potential watermark symbols that are located within the host content subsequent in time or space to the detected synchronization pattern are extracted from the host content. For example, k can be 1 in the initial iteration of the process that is described in FIG. 2. At 206, a candidate watermark is formed by obtaining a plurality, W-H-k, of symbols corresponding to a watermark that precedes, in time or space, the detected synchronization pattern, and appending the plurality, W-H-k, of symbols to the first number, k, of potential watermark symbols and to the H symbols of the synchronization pattern.

At 208, it is determined (via, for example, application of error correction codes) whether or not the candidate watermark is a valid watermark. For example, a candidate watermark that has error correction code symbols can be subjected to error correction code (ECC) decoding to determine if a valid watermark is present. In another example, where the correct watermark payload is known ahead of time, template matching techniques can be used to test whether or not the candidate watermark matches the known template within an acceptable error tolerance. Upon a determination that the candidate watermark is a valid watermark, a successful watermark detection is declared at 210. Upon a determination at 208 that the candidate watermark is not a valid watermark, k is incremented by a particular number, and the operations at 204 through 208 are repeated. It should be noted that upon return to operation 204 from operation 212, it is only needed to extract the additional symbols that were not extracted from the host content in the previous iteration. Using the technique that is described in connection with FIG. 2, the detection of a watermark can be expedited using the bit buffer without having to wait for the detection of a full watermark that follows a synchronization header. This technique, therefore, can allow successful detection of a watermark from a short content segment, which is an important for ACR applications.

In one exemplary embodiment, determining whether or not the candidate watermark forms a valid watermark at 208 includes performing error correction code decoding on the candidate watermark. In another exemplary embodiment, determining whether or not the candidate watermark forms a valid watermark includes forming a template that represents symbols of a valid watermark message, comparing the candidate watermark to the template, obtaining a number of mismatches between the template and the candidate watermark message that is below a predetermined threshold, thus indicating that a valid watermark (or portion thereof) has been detected. In some embodiments, upon a determination that the candidate watermark does not form a valid watermark, the value of k is incremented by an integer value, an additional number of candidate watermark symbols equal to the integer value are extracted from the multimedia content, and operations 206 and 208 are repeated.

One of the objectives of watermark based ACR system is to report the timing of the marked segment boundaries. In a typical scenario, where a content segment is linearly accessed and analyzed to detect the presence and boundaries of embedded watermarks, all of the bits of the first detected watermark in a marked segment are extracted from the content. But in some cases, even if the beginning of the first watermark is lost or missing (e.g., due to a channel change), error correction feature of the data link layer of the watermarking system may enable full payload extraction even if some of the payload symbols are missing or are corrupted. In this scenario, the reported start of a marked segment may not be 100% accurate and may erroneously extend to the previous segment by a small amount (e.g., by a few watermark symbols). In the typical scenario described above, the time interval before the beginning of the first detected watermark is most likely unmarked, such as in the scenario of a channel change which causes a brief audio silence and/or blank interval to precede a new segment.

In some scenarios, such as in the presence of signal distortions, it is also possible that the interval before the beginning of the first detected watermark in a marked content is also marked, but watermarks in that interval could not be successfully detected. For example, those distortions due to content processing or distribution channel noise may have created too many bit errors that are beyond the correction capabilities of the implemented error correction code algorithms. In these scenarios, the reported first watermark in the segment may not correctly identify the beginning of the marked segment.

In some embodiments, marked segment boundary detection is improved when the bit pattern in adjacent watermarks (or more generally, in other watermarks that are located at a known distance from a previously detected watermark) can be predicted based on another detected watermark. For example, detection of the beginning of a marked segment can be improved after detection of another watermark in the marked segment. In this case, a segment of the bit pattern corresponding to a later-detected watermark having L bits is designated as the predicted bit pattern. Next, the bit-buffer containing previously detected bits of the marked segment examined to assemble the detected bits into groups of L consecutive bits, and the assembled bit group is compared to the predicted bit pattern. If the number of bit mismatches, or bit errors, is smaller than a predetermined threshold, the section of the host content that included the assembled group of bits is considered marked. The value of the predetermined threshold depends on the value of L ($2 \leq L \leq W$, where W is the full length of the embedded bit pattern). In some embodiments, the value of L is determined experimentally. Where there are a plurality of different predicted bit patterns (e.g., when the patterns—or values—of watermarks in the host content differ from one another in a known manner), each predicted pattern may be considered and examined in the same manner that was described above. In some embodiments, the beginning segment of a later detected watermark bit pattern is selected to serve as the predicted bit pattern.

When the number of bit errors in the detected group of bits is above the predetermined threshold, the corresponding section or interval of content is likely unmarked. Thus, the beginning of the marked segment is set to the beginning of the last group of L bits that produced a bit error count below the predetermined threshold. Based on experiments conducted by the inventors, in some cases, the comparison of the group of L bits produces a high error count not because the content segment is unmarked, but because the content segment is not suitable for hosting watermarks. For example, the host content may be able to accommodate embedded audio watermarks in segments with audio silence. In other cases, an embedded segment may be severely damaged due various sources of noise or distortion, such as when a content segment is particularly damaged due to signal processing. In some embodiments, when the comparison with the predicted pattern produces more errors than the predetermined threshold, additional bits from the bit-buffer are retrieved, one or more additional groups of previously detected bits are assembled and compared to the predicted pattern. In this case, the beginning of the marked segment is identified as the beginning of the last group of previously detected bits that produced an error count below the threshold (only if several of subsequent groups of bits all have error counts above the threshold). In some embodiments, this process can be repeated until all previously detected bits of the bit buffer (which is necessarily limited in size) are exhausted.

Similarly, the end of a marked segment can be determined by predicting subsequent bit patterns (i.e., L-bit predicted patterns) comparing the detected bits with the predicted bit patterns, and counting the number of errors in L-bit long consecutive groups of bits. The segment end can be reported at the end of the last group of bits with error count below a predetermined threshold. Before reporting the marked segment end, it is desirable to establish that all of several groups of bits subsequent to the detection of the end segment have error counts above the threshold.

Alternatively, or additionally, the marked segment end reporting can be delayed by a predefined time interval T. If no further watermarks are detected within the interval T, then the watermark segment end is reported with the detected timing as described above. However, if a new watermark is detected before the time interval T has expired, the detected watermark is examined to determine whether or not (a) the newly detected watermark identifies the same content as the previously detected watermarks, and (b) the temporal location of the newly detected watermark fits the temporal pattern (i.e., a predetermined pattern) of embedded watermarks. If so, the marked segment end is not reported and the detector assumes that the newly detected watermark is part of the marked content segment. However, if new watermark doesn't identify the same content as the previous watermarks, or its position in time doesn't fit the watermark embedding pattern, the marked segment end, with timing established as described above, is reported. It should be noted that while the above techniques has been described in the context of temporal locations of watermarks (e.g., in an audio component), this technique is similarly applied to spatially separated watermarks (e.g., in a still image) or watermarks that are separated in a frequency domain.

The above described bit pattern prediction is applicable even in cases where watermark state transitions are allowed but cannot be predicted because the media timeline has not been established yet. In this case, a particular watermark state transition can (but does not need to) happen at the watermark boundary with the next (or previous) allowed watermark state. In this scenario, at the end of each watermark, bit-strings for two (or more) predicted patterns can be constructed (i.e., one without the transition, and one or more corresponding to each of the possible transitions). The predicted patterns are then compared to the extracted bits, and the comparison result that produces a bit error below the threshold is selected as the correct prediction.

It should be noted that marked segment start or end are often associated with playback gaps. For example, channel change on a set top box (STB) usually produces a brief silence in the audio section of the content that is being viewed. In some embodiments, such gaps or silence intervals are detected and used to increase the precision of marked segment start or end detection. For example, if an end-of-silence is detected during a search for the marked segment start location, and (a) such an end-of-silence is identified as occurring somewhere in the last group of detected bits with an error count below the predetermined threshold, or (b) if the end-of-silence is identified as occurring in the subsequent group of detected bits with an error count above the predetermined threshold, then this end-of-silence event is identified as the start of a marked segment. Similarly if a start-of-silence is found to occur during the search for the marked segment end location, and this event happens (a) during the last group of detected bits that have error count below threshold, or (b) during the next group of detected bits with error count above threshold, this start-of-silence event is identified as the end of a marked segment.

Detector-Database Messages

In order to minimize data exchanges between the watermark detector and the database, in some embodiments, the detector keeps collecting information about detected marks and marked segment boundaries, and transfer them to the database periodically (e.g., once a day). However, in some applications (e.g. in the case of live events), it may be desirable to obtain real time information about the content usage, and perhaps make real time adjustments to the content. In this case, it is desirable to report the beginning of the marked segment and the end of the marked segment upon detection of such events.

It should be noted that sometimes the marked segment usage can end abruptly, e.g., by having a user turn off the rendering device or the application that incorporates the watermark detector. In this case, it is desirable to have the detector report to the database the marked segment end event prior to being shut down. However, this may not always be possible or successful, and alternatively, or additionally, the detector can report "marked content in use" periodically, say every five minutes.

In the cases where media time is established using the watermark state transitions, it may be desirable to communicate to the database at least the first event in the marked segment that establishes the media timeline. Alternatively, each watermark state transition event may be reported, which also serves to send "marked content in use" information to the database. In scenarios where the watermark detector cannot, by itself, interpret the watermark state transitions, reporting those transitions to the database (e.g., metadata server) allows those transitions to be interpreted at, or in cooperation with, the database. Thus, the selection of a particular payload format for embedding the watermarks can determine the extent of communications that are needed between the watermark detectors and the database.

A content may be provided to a particular device (e.g., a TV set) using a one or more distribution channels, such as over the air, cable, satellite, over the top, etc. In some embodiments, the ACR watermarks can be used to measure distribution channel latencies during broadcast or streaming of live events. Latency refers to an amount time that it takes for the content that is transmitted from one entity (e.g., a broadcaster) to reach another entity (e.g., a user device). In one implementation, a distinct watermark payload is embedded in each distribution channel. Upon detection and reporting of distinct watermarks and associated state transitions to the database, different distribution channels can be compared to establish the latencies associated with each distribution channel. The timing of the detection report arrivals can be affected by delays in data communication, but those delays are either typically negligible compared to content distribution latencies, or they can be measured and subtracted from the observed total latency. It should be noted that, in some embodiments, once the latency in a distribution channel is known, then the media timeline during a linear playback at the rendering device can be established without further watermark state transition observations. Further, knowing the latencies of different channels, content broadcasters or distributors can adjust the latencies of the corresponding distribution channels to provide a improve and better synchronize content distribution among all consumers of the event. Such an equalization of latencies can be important for distribution of live events, or in social media applications where two or more parties are participating in an activity.

Alternatively, the same watermark payloads can be used in all distribution channels, but the detector reports need to be somehow associated with the distribution channel. In one example, the devices with known IP addresses are placed at the ends of predefined distribution channels, and the timing of the received reports received from those IP addresses can be compared. In one implementation, content transition events, e.g., transitions between two ads in a series of ads (or ad pod) that is broadcast on multiple channels, are used to measure the latency in the channels. This way, the need for artificial watermark state transitions can be eliminated, which would reduce the size of the watermark payload.

In some embodiments, one method of establishing media time during content usage includes creating watermark state transitions on predefined moments by embedding content with a watermark having a payload with a watermark counter field, and incrementing the watermark counter with each embedded watermark. This exemplary method further includes reporting the extracted payload to a database, and calculating media time at the database using the watermark counter state at the beginning of the content stored in the database. In some embodiments, the watermark counter in incremented after every N watermarks. In another embodiment, the method also includes detecting actions that do not have watermarks by using a transition that came after the action itself. In yet another embodiment, the method further includes establishing media time during content usage that includes using transitions in a watermark stego key to establish a media timeline. In another embodiment, the above noted method includes having all payload options use the same set of stego keys.

In some embodiments, a method of watermark payload extraction includes determining if a watermark bit-string is the same in two or more adjacent watermarks, and if so, going back in time to establish watermark bit-string prior to the detected header pattern. In some embodiments, a method of segment boundary detection when the bit pattern in adjacent watermarks can be predicted based on the detected watermark includes going through the bit-buffer containing previously detected bits and assembling the detected bits in groups of L consecutive bits. This method further includes comparing the assembled bits with the predicted bit pattern, determining if the number of bit mismatches is smaller than a threshold, and if so, considering the group of bits to contain a watermark, but if the number of bit mismatches is larger than a threshold, considering the group of bits to not contain a watermark.

Another embodiment of the disclosed technology relates to a method of determining the end of a watermarked segment that includes predicting subsequent bit patterns, comparing detected bits with predicted bits, counting errors in L bit long consecutive groups, and reporting the segment end at the end of the last group of bits with error count below the threshold. Yet another method of minimizing data exchanges between a detector and a database includes collecting information about detected marks and marked segment boundaries, and transferring the collected information to a database periodically.

In some embodiments, the watermarks that are embedded in the content are formed according to a flexible format that accommodates watermark payloads having different sizes. The flexible payload format allows the watermarking system to be used in different applications and with different systems, while providing compatibility with existing content identification schemes. In FIG. 3, Table 1 provides an exemplary listing of watermark payload structures for embedding multiple payload formats. In this exemplary listing, 4 types of watermark payloads are identified: Short, Medium, Long and Extra Long. The payload format and the corresponding data can be selected at the time of embedding the watermarks (or prior to embedding the watermarks). The identifier field enables the encoding of one or more types of content identifiers using the specified number of bits. Table 1 provides 8 identifier encodings (Ad-ID (Compact), EIDR (Party ID), EIDR (Service ID), Ad-ID (Full), EIDR (Short DOI), SCIC, EIDR (Content ID) and EIDR (Compact Binary)), with the remainder reserved for future use. For example, the short payload format, having an encoding type field value of 0 is used for embedding an AD-ID in compact form.

These payloads, once embedded in a content, have been demonstrated to be recoverable with high reliability through testing of broadcast, cable, and mobile distribution environments and have operated reliably in field trials. As shown in the "retrievability" column in Table 1, the embedded watermarks can be detected in less than 5 seconds. The above described watermarking technology based on the flexible payload format is compatible with IP distribution protocols (e.g. adaptive streaming) employed for managed, unmanaged, and in-home video distribution. In some embodiments, the watermarks that are embedded using the flexible payload format of Table 1 form an additional layer of an existing watermarking system. The following provides a short description of the eight identifiers that are listed in Table 1. The proposed technology.

Ad-ID (Compact) Encoding: The Ad-ID (Compact) encoding is the compact 32-bit representation of the Ad-ID identifier referenced in Section 1.1.1 of the SMPTE RfP followed by seven zero-value bits.

EIDR (Party ID) Encoding: The EIDR (Party ID) encoding is a lossless encoded representation of the 17-character EIDR Party ID representation defined in Section 2.2 of the EIDR Identifier Format specification (ID Format, v1.2. Entertainment Identifier Registry Association, Mar. 3, 2014, http://eidr.org/document:/EIDR_ID_Format_v1.2.pdf).

EIDR (Service ID) Encoding: The EIDR (Service ID) encoding is a lossless encoded representation of the 8-character EIDR Service ID representation defined in Section 2.2 of the EIDR Identifier Format specification.

Ad-ID (Full) Encoding: The Ad-ID (Full) encoding is a lossless encoded representation of the full 12-character Ad-ID.

EIDR (Short DOI) Encoding: The EIDR (Short DOI) encoding is a lossless encoded representation of the 8-character EIDR Short DOI representation defined in Section 3.4 of the EIDR Identifier Format specification.

SCIC Encoding: SCIC (short for "server code/interval code") enables content identification with industry standard identifiers and frame-accurate recovery of the content timeline via a network resource identified by the watermark payload. The payload includes encoded representations of an 8-character server code which identifies the network resource and an 8-character interval code which identifies the location on the timeline of the payload. For example, the server code can identify the address of a server providing service signaling for the interval of the content that includes the embedded watermark. The server code and interval code recovered from the payload are employed in a stateless network transaction to access a network resource containing an industry standard identifier and a mapping from the interval code to a point on the content timeline. When SCIC encoding is employed, a content item (e.g. ad, program, or program segment) is continuously marked with watermark payloads carrying a constant server code value and sequentially increasing interval codes values.

Figure 4A:
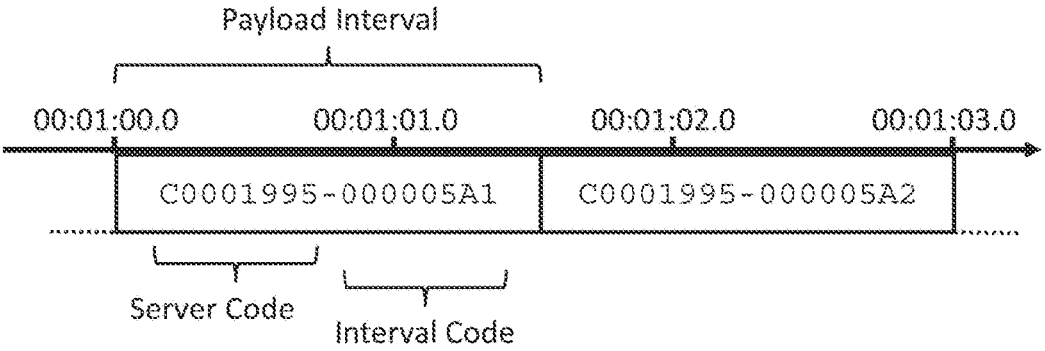
FIG. 4(A) illustrates an example of a content segment that is embedded with two back-to-back watermarks according to server-code-interval-code (SCIC) encoding.
Figure 4B:
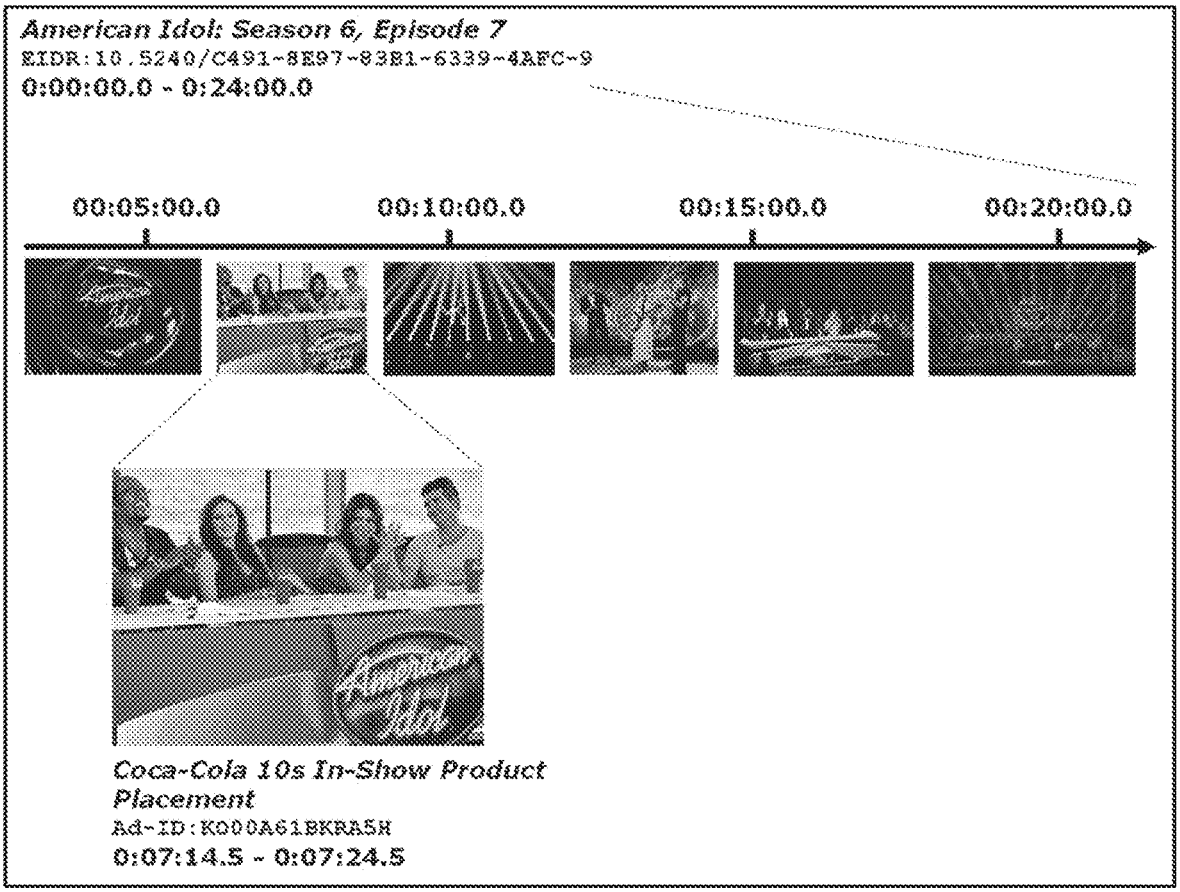
FIG. 4(B) illustrates a multimedia content timeline and associated identification values that are obtained using the disclosed embodiments.

FIG. 4(A) provides an example of a content segment that is embedded with two back-to-back watermarks according to SCIC encoding. The following provides a protocol for the network transaction (the "SCIC protocol") as outlined further below. FIG. 4(B) illustrates the timeline and associated identification value that are obtained using the disclosed embodiments for a multimedia content, namely, Season 6, Episode 7 of American Idol TV program, with the displayed EIDR. The lower part of the FIG. 4(B) shows an advertisement that is presented during the TV program, having a specific Ad-ID value. The exact boundaries of the advertisement (0:07:14.5-0:07:24.5) are also obtained and displayed.

A client on resolves a SCIC payload by issuance of an HTTP query to a network resource formed using a standardized URL template. One example of such a query can be: http://{ServerCode}.obid.vp1.tv/{IntervalCode}.obid. The query is routed via IP protocols to a network server hosting identification information for the content item via a central server code registry operating the DNS root server of the domain designated in the template (e.g., obid.vp1.tv). The server receiving the query can respond by delivering a file in a standardized format (e.g., a XML, schema) containing an identifier (e.g., Ad-ID or EIDR) and a mapping between the interval code and the timeline of the content item (e.g. interval code 00000000 maps to content time 0:00:00.00).

The information obtained from a single query completely identifies the content item and its timeline, so a query need only be performed once each time a content item is encountered. For example, if a watermark detector processes a content item and recovers contiguous SCIC identifiers with server code C0001995 and interval codes starting with 00000000 and incrementing sequentially through 00000007, it is only necessary to query once with the first server code/interval code pair, and the identity of the content and portion of the content which is presented (e.g., Ad-ID ABCD12A1H65, timeline 0:00:00.00-0:00:12.00) is evident.

The SCIC encoding approach includes designation of a central registrar to manage issuance of server codes and maintain the DNS root server with canonical mappings of server codes to server names. Server code registrants have independent control over the assignation of interval codes to content for that server code. They are responsible for maintaining a valid server mapping with the registrar and for maintaining a server which hosts valid query responses and responds to queries issued by clients.

This use of SCIC approach supports a wide range of use cases. For example, the registrant might be a content producer that wants to manage and use codes within content that they produce, a network that wants to manage and use codes within content that they distribute, or a service provider that wants to handle identification queries on behalf of one or more content producers or networks. Registrants may also direct queries to servers operated by third-parties (e.g. CDNs, managed service providers). The architecture employed with SCIC encoding requires only lightweight administration, operates in a highly decentralized, scalable and efficient manner, and relies on proven internet protocols and stateless transaction processing technology.

EIDR (Content ID) Encoding: The EIDR (Content ID) encoding is a lossless encoded representation of the 34-character EIDR Content ID representation defined in Section 2.2 of the EIDR Identifier Format specification.

EIDR (Compact Binary) Encoding: The EIDR (Content ID) encoding is the 96-bit compact binary representation of the EIDR ID defined in Section 3.1.1 of the EIDR Identifier Format specification.

Figure 5:
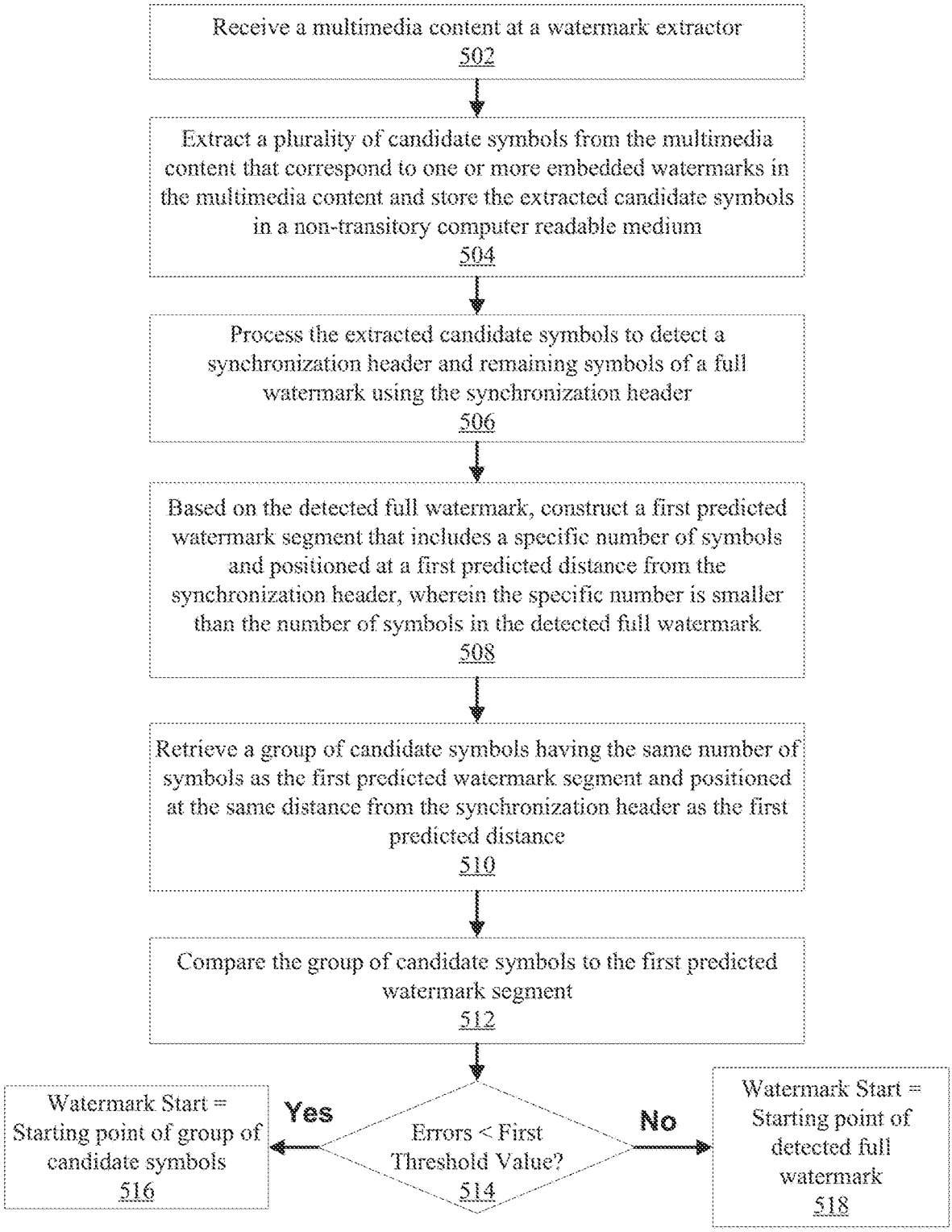
FIG. 5 illustrates a set of exemplary operations that can be carried out to detect one or more boundaries of a watermarked segment in a multimedia content in accordance with an exemplary embodiment.

FIG. 5 illustrates a set of exemplary operations that can be carried out to detect one or more boundaries of a watermarked segment in a multimedia content in accordance with an exemplary embodiment. In the operations that are described in FIG. 5, it is assumed that a full watermark includes a header pattern followed by payload symbols. At 502, the multimedia content is received at a watermark extractor that is implemented at least partly using electronic circuitry. At 504, at the watermark extractor, a plurality of candidate symbols are extracted from the multimedia content that correspond to one or more embedded watermarks in the multimedia content and the extracted candidate symbols are stored in a non-transitory computer readable medium. At 506, the extracted candidate symbols are processed to detect a synchronization header and the remaining symbols of a full watermark using the synchronization header. At 508, based on the detected full watermark, a first predicted watermark segment is constructed that includes a specific number of symbols and is positioned at a first predicted distance from the synchronization header. The specific number is smaller than the number of symbols in the detected full watermark.

At 510, a group of candidate symbols are retrieved from the non-transitory computer readable medium, where the group of candidate symbols have the same number of symbols as the first predicted watermark segment and are positioned at the same distance from the synchronization header as the first predicted distance. At 512, the group of candidate symbols is compared to the first predicted watermark segment. At 514, it is determined whether or not the number of mismatched symbols between the group of candidate symbols and the first predicted watermark segment is less than a first threshold value. If the condition at 514 holds true, the starting point of the group of candidate symbols is designated, at 516, as a starting section of the watermarked segment within the multimedia content. If the condition at 514 does not hold true, starting point of the detected full watermark is designated as the starting section of the watermarked segment within the multimedia content. The process that is described in FIG. 5 can be repeated with additional predicted segments that further precede the synchronization header location. That is, additional predicted watermark segments are constructed and compared to the contents of the bit buffer until no more matches can be obtained.

In one exemplary embodiment, upon a determination that the number of mismatched symbols between the group of candidate watermark symbols and the first predicted watermark segment is equal to, or larger than, the first threshold value, the method further includes designating the starting point of the detected full watermark as the starting section of the watermarked segment within the multimedia content. In some embodiments, the first predicted watermark segment is identical to a portion of the detected full watermark. In some embodiments, the first predicted watermark segment includes symbols that are different from the detected full watermark in accordance with a known pattern of embedded watermarks in the multimedia content. In a further embodiment, the known pattern of embedded watermarks in the multimedia content includes a known transition in a counter value of watermarks. In yet another embodiment, the known pattern of embedded watermarks in the multimedia content is determined based on a known change in an embedding stego key of watermarks.

According to an exemplary embodiment, the above noted method further includes, instead of designating the starting point of the detected full watermark as the starting section of the watermarked segment within the multimedia content, constructing one or more additional predicted watermark segments that include the specific number of symbols and positioned at the first predicted distance from the synchronization header. The operations in this embodiment further include comparing the group of candidate watermark symbols to the one or more additional predicted watermark segments, upon a determination that the number of mismatched symbols between the group of candidate watermark symbols and any one of the one or more additional predicted watermark segments is less than the first threshold value, designating the starting point of the group of candidate watermark symbols as the starting section of the watermarked segment within the multimedia content, and upon a determination that the number of mismatched symbol between the group of candidate watermark symbols and each of the additional predicted watermark segments is equal to, or larger than, the first threshold value, designating the starting point of the detected full watermark as the starting section of the watermarked segment within the multimedia content.

In some exemplary embodiments, the above noted method further includes, instead of designating the starting point of the detected full watermark as the starting section of the watermarked segment within the multimedia content, constructing a second predicted watermark segment based on the detected full watermark, where the second predicted watermark segment positioned at a second predicted distance from the synchronization header that is further than the first predicted distance. The operations in such embodiments further include retrieving, from the non-transitory computer readable medium, an additional group of candidate watermark symbols having the same number of symbols as the second predicted watermark segment and positioned at the second distance from the synchronization header, comparing the additional group of candidate watermark symbols to the second predicted watermark segment, upon a determination that a number of mismatched symbols between the additional group of candidate watermark symbols and the second predicted watermark segment is less than a second threshold value, designating the starting point of the additional group of candidate watermark symbols as the starting section of the watermarked segment within the multimedia content, and upon a determination that the number of mismatched symbols between the additional group of candidate watermark symbols and the second predicted watermark segment is equal to, or larger than, the second threshold value, designating the starting point of the detected full watermark as the starting section of the watermarked segment within the multimedia content.

In one exemplary embodiment, the second predicted watermark segment is constructed based on a different section of the detected full watermark than the first predicted watermark segment. In another exemplary embodiment, the above noted operations further include transmitting information regarding the starting section of the watermarked segment to a metadata server. In yet another exemplary embodiment, the operations further include processing the extracted candidate watermark symbols to detect additional full watermarks, and upon a failure to detect one or more additional full watermarks, constructing a second predicted watermark segment based on a previously detected full watermark, where the second predicted watermark segment positioned at a second predicted distance ahead of the previously detected full watermark and having L symbols, wherein L is smaller than the number of symbols in the previously detected full watermark. In this embodiment, the operations further include retrieving, from the non-transitory computer readable medium, a second group of candidate watermark symbols having the same number of symbols as the second predicted watermark segment and positioned at the same distance as the second predicted distance from the previously detected full watermark, comparing the second group of candidate watermark symbols to the second predicted watermark segment, and upon a determination that a number of mismatched symbols between the second group of candidate watermark symbols and the second predicted watermark segment is less than a second threshold value, designating the ending point of the second group of candidate watermark symbols as an end section of the watermarked segment within the multimedia content. However, upon a determination that the number of mismatched symbols between the second group of candidate watermark symbols and the second predicted watermark segment is equal to, or larger than, the second threshold value, designating the ending point of the previously detected full watermark as the end section of the watermarked segment within the multimedia content.

According to one exemplary embodiment, the second predicted watermark segment includes at least a portion of a pattern present in the synchronization header. In another exemplary embodiment, the second predicted watermark segment is identical to a portion of the detected full watermark. In yet another exemplary embodiment, the second predicted watermark segment includes symbols that are different from the previously detected full watermark in accordance with a known pattern of embedded watermarks in the multimedia content.

According to another exemplary embodiment, the method for detecting one or more boundaries of a watermarked segment in a multimedia content further includes, upon the failure to detect one or more additional full watermarks, processing the multimedia content for an additional interval of time to determine whether or not further full watermarks are detectable from the multimedia content, and upon a determination that no other full watermarks are detected during the additional time interval, proceeding with the constructing of the second predicted watermark segment. In another exemplary embodiment, the candidate watermark symbols are obtained from one or more of: an audio component of the multimedia content, a video component of the multimedia content, or a still image component of the multimedia content. In yet another exemplary embodiment, all of the remaining symbols of the detected full watermark succeed a location of the synchronization header. In still another exemplary embodiment, at least some of the remaining symbols of the detected full watermark precede a location of the synchronization header.

Another aspect of the disclosed embodiments relates to a method for determining a timeline of a watermarked segment of a multimedia content, that includes extracting, at a device equipped with a watermark extractor that is implemented at least in part using electronic circuitry, one or more watermarks from the watermarked segment, where the one or more watermarks include a payload that enables identification of the multimedia content. This method further includes detecting a watermark state change in one of the one or more extracted watermarks, where the detected state change is indicative of a change in the detected payload value of the one or more extracted watermarks or a change in a stego key associated with the one or more extracted watermarks. The above noted method further includes forming one or more messages for delivery to a metadata server, where the one or more messages include: at least a portion of the payload of the one or more extracted watermarks including information indicative of the detected watermark state change and information indicative of a time of detection of a first watermark from the watermarked segment. In this method, operations at the metadata server include using information from the one or more messages to identify the multimedia content, using the detected state change and information stored at the metadata server to identify an instant in media timeline at which the detected state change is designated to happen, using the time of detection of the first watermark and the instant in media timeline at which the detected state change is designated to happen to determine the timeline of the watermarked segment accessed by the device.

Figure 6:
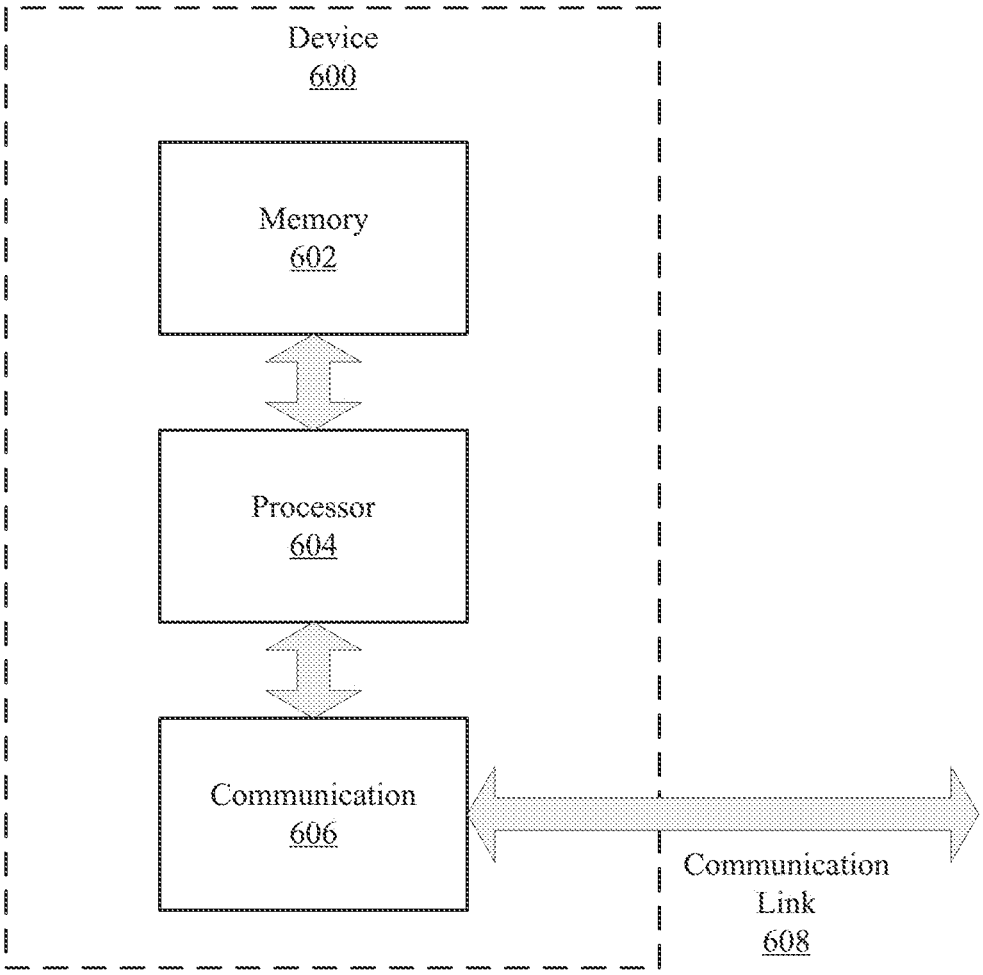
FIG. 6 illustrates a block diagram of an exemplary device that can accommodate the disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 6 illustrates a block diagram of a device 600 within which the various disclosed embodiments may be implemented. The device 600 comprises at least one processor 602 and/or controller, at least one memory 604 unit that is in communication with the processor 602, and at least one communication unit 606 that enables the exchange of data and information, directly or indirectly, through the communication link 608 with other entities, devices and networks. The communication unit 606 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

The disclosed devices or modules can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for embedding watermarks in multimedia content comprising:

generating a watermark registry database, which includes links between watermark codes and content metadata;

embedding content with a succession of watermarks using a watermark [embedded] *embedder* that is implemented at least partly in electronic circuitry, each embedded watermark including a payload, wherein the embedded watermarks have a flexible payload format that allows for *alternative* watermark payloads[having different sizes];

wherein the embedding including using [a] *one or more* predetermined embedding stego [key] *keys* to embed each watermark, the *one or more* embedding stego [key] *keys* identifying potential locations for watermark embedding and identifying particular characteristics of the watermarks, wherein the same *one or more* embedding stego [key] *keys* [is] *are* used to embed each of the succession of watermarks; and storing a record of the embedded watermark payload in the watermark registry database, wherein the database links some of the embedded watermarks to at least one alternative payload[with a different payload size].

2. The method according to claim 1 further comprising:

identifying upstream watermarks at locations in the content different from the locations of the embedded watermarks, the upstream watermarks having been previously stored in the watermark registry database;

receiving the content at a watermark extractor that is implemented at least partly in electronic circuitry;

using the watermark extractor to extract watermark symbols from the embedded watermarks in the multimedia content;

[retrieving a new watermark payload from the identified upstream watermark in the watermark registry database;]

overwriting the extracted watermark with a new watermark having [the new] *a* watermark payload [of a] different [size] from the embedded watermark payload, using a downstream watermark embedder employing the *one or more* predetermined embedding stego [key] *keys*; and

[storing] *saving* a record of the overwritten watermarks and the new watermarks in the watermark registry database for later use.

3. The method according to claim 1 further comprising:

identifying upstream metadata linked to locations different from the locations of the embedded watermarks in the content, the upstream metadata having been previously stored in the watermark registry database;

receiving the content at a watermark extractor;

using the watermark extractor to extract watermark symbols from the embedded watermarks in the multimedia content;

[retrieving the upstream metadata in the watermark registry;]

overwriting the extracted watermark with a new watermark having an alternate watermark payload, which is based on the metadata, the alternate payload having a different size from the embedded watermark payload, using a downstream watermark embedder employing the *one or more* predetermined embedding stego [key] *keys*; and

[storing] *saving* a record of the overwritten watermarks and the new watermarks in the watermark registry database for later use.

4. The method according to claim 3 wherein the metadata includes a compact watermark code that is linked to a DOI.

5. The method according to claim 1 wherein the embedded watermark payload includes a content identifier.

6. The method according to claim 5 wherein the content identifier is one of: AdID or EIDR.

7. The method according to claim 1 wherein the embedded watermark payload facilitates the establishment of a media timeline.

8. The method according to claim 7 wherein the embedded watermark payload includes a server code and an interval code.

9. The method according to claim 1 wherein the *one or more* stego [key] *keys* comprises of a set of stego keys and wherein each watermark is embedded with the same set of stego keys.

10. The method according to claim 1 wherein the embedded watermarks are audio watermarks.

11. The method according to claim 1 wherein the embedded watermarks are video watermarks.

12. A device comprising:

a processor; and a memory including processor executable code, the processor executable code, when executed by the processor, causes the device to:

generate a watermark registry database, which includes links between watermark codes and content metadata;

embed content with a succession of watermarks using a watermark embedded that is implemented at least partly in electronic circuitry, each embedded watermark including a payload, wherein the embedded watermarks have a flexible payload format that allows for *alternative* watermark payloads[having different sizes];

wherein the embedding including using [a] *one or more* predetermined embedding stego [key] *keys* to embed each watermark, the *one or more* embedding stego [key] *keys* identifying potential locations for watermark embedding and identifying particular characteristics of the watermarks, wherein the same *one or more* embedding stego [key is] *keys are* used to embed each of the succession of watermarks; and store a record of the embedded watermark payload in the watermark registry database, wherein the database links some of the embedded watermarks to at least one alternative payload[with a different payload size].

13. The device according to claim 12, the processor executable code, when executed by the processor, causes the device to:

identify upstream watermarks at locations in the content different from the locations of the embedded watermarks, the upstream watermarks having been previously stored in the watermark registry database;

receive the content at a watermark extractor that is implemented at least partly in electronic circuitry;

use the watermark extractor to extract watermark symbols from the embedded watermarks in the multimedia content;

[retrieve a new watermark payload from the identified upstream watermark in the watermark registry database;]

overwrite the extracted watermark with a new watermark having [the new] *a* watermark payload [of a] different [size] from the embedded watermark payload, using a downstream watermark embedder employing the *one or more* predetermined embedding stego [key] *keys*; and

[store] *save* a record of the overwritten watermarks and the new watermarks in the watermark registry database for later use.

14. The device according to claim 12, the processor executable code, when executed by the processor, causes the device to:

identify upstream metadata linked to locations different from the locations of the embedded watermarks in the content, the upstream metadata having been previously stored in the watermark registry database;

receive the content at a watermark extractor;

use the watermark extractor to extract watermark symbols from the embedded watermarks in the multimedia content;

[retrieve the upstream metadata in the watermark registry;]

overwrite the extracted watermark with a new watermark having an alternate watermark payload, [which is based on the metadata,] the alternate payload having a different size from the embedded watermark payload, using a downstream watermark embedder employing the *one or more* predetermined embedding stego [key] *keys*; and

[store] *save* a record of the overwritten watermarks and the new watermarks in the watermark registry database for later use.

15. The device according to claim 12 wherein the metadata includes a compact watermark code that is linked to a DOI.

16. The device according to claim 12 wherein the embedded watermark payload includes a content identifier.

17. The device according to claim 12 wherein the embedded watermark payload facilitates the establishment of a media timeline.

18. The device according to claim 12 the embedded watermark payload includes a server code and an interval code.

19. The device according to claim 12 wherein the *one or more* stego [key] *keys* comprises of a set of stego keys and wherein each watermark is embedded with the same set of stego keys.

20. A method for processing watermarks in multimedia content comprising: receiving the multimedia content at a watermark extractor that is implemented at least partly in electronic circuits, wherein the multimedia content has been embedded with a succession of watermarks, each watermark including a payload, and wherein the embedded watermarks have a flexible payload format that allows for *alternative* watermark payloads[having different sizes], and wherein the embedding includes using [a] *one or more* predetermined embedding stego [key] *keys* to embed each watermark, the *one or more* embedding stego [key] *keys* identifying potential locations for watermark embedding and identifying particular characteristics of the watermarks, wherein the same *one or more* embedding stego [key] *keys* is used to embed each of the succession of watermarks, and wherein a record of the embedded watermark payload has been stored in a watermark registry database, wherein the database links some of the embedded watermarks to at least one alternative payload[with different payload size];

at the watermark extractor, extracting watermark symbols from the embedded watermarks in the multimedia content;

overwriting extracted watermarks with new watermarks having a new *alternative* watermark payload [of a] different [size] from the embedded watermark payload using a downstream watermark embedder employing the *one or more* predetermined embedding stego [key] *keys*; and

[storing] *saving* a record of the overwritten watermarks and the new watermarks in a watermark registry database for later use.

*21. The method according to claim 1 wherein the alternative watermark payloads have different sizes.*

*22. The method according to claim 12 wherein the alternative watermark payloads have different sizes.*

*23. The method according to claim 20 wherein the alternative watermark payloads have different sizes.*

* * * * *